US005205733A

United States Patent [19]

Scheels

[11] Patent Number: 5,205,733

[45] Date of Patent: Apr. 27, 1993

[54] VETERINARY MOUTH PROP

[76] Inventor: John L. Scheels, 12705 W. Wilbur Dr., New Berlin, Wis. 53151

[21] Appl. No.: 837,751

[22] Filed: Feb. 19, 1992

[51] Int. Cl.[5] .......................... A61D 5/00; A61C 5/00

[52] U.S. Cl. .......................................... 433/1; 433/140

[58] Field of Search ...................... 433/1, 93, 136, 140

[56] References Cited

U.S. PATENT DOCUMENTS

| | | | |
|---|---|---|---|
| 692,281 | 2/1902 | Hare | 433/93 |
| 2,019,060 | 10/1935 | Thibert | 128/6 |
| 2,023,288 | 12/1935 | Pickett | 128/12 |
| 2,103,115 | 12/1937 | Mizzy | 32/1 |
| 2,220,674 | 11/1940 | Bloomheart | 128/12 |
| 2,570,459 | 10/1951 | Kreider | 128/12 |
| 2,823,455 | 2/1958 | Sprague | 32/33 |
| 3,217,708 | 11/1965 | Roberts | 128/136 |
| 3,483,619 | 12/1969 | Smith | 32/40 |
| 3,722,101 | 3/1973 | Via | 32/40 |
| 4,179,815 | 12/1979 | Hoffman | 433/140 |
| 4,380,888 | 4/1983 | Lanham | 433/1 X |
| 4,573,919 | 3/1986 | Sinkora | 433/140 |
| 4,869,669 | 9/1989 | Grubbs | 433/140 |
| 4,887,965 | 12/1989 | Fox | 433/140 |
| 4,975,057 | 12/1990 | Dyfvermark | 433/93 |

FOREIGN PATENT DOCUMENTS

| | | | |
|---|---|---|---|
| 524708 | 5/1956 | Canada | 433/140 |

*Primary Examiner*—Gene Mancene
*Assistant Examiner*—Nicholas D. Lucchesi
*Attorney, Agent, or Firm*—Joseph S. Heino

[57] ABSTRACT

A veterinary mouth prop is molded from a single piece of radiolucent material and has two external surfaces adapted to engage the occlusal surfaces of the molars on one side of the patient's mouth.

6 Claims, 1 Drawing Sheet

FIG. 1.
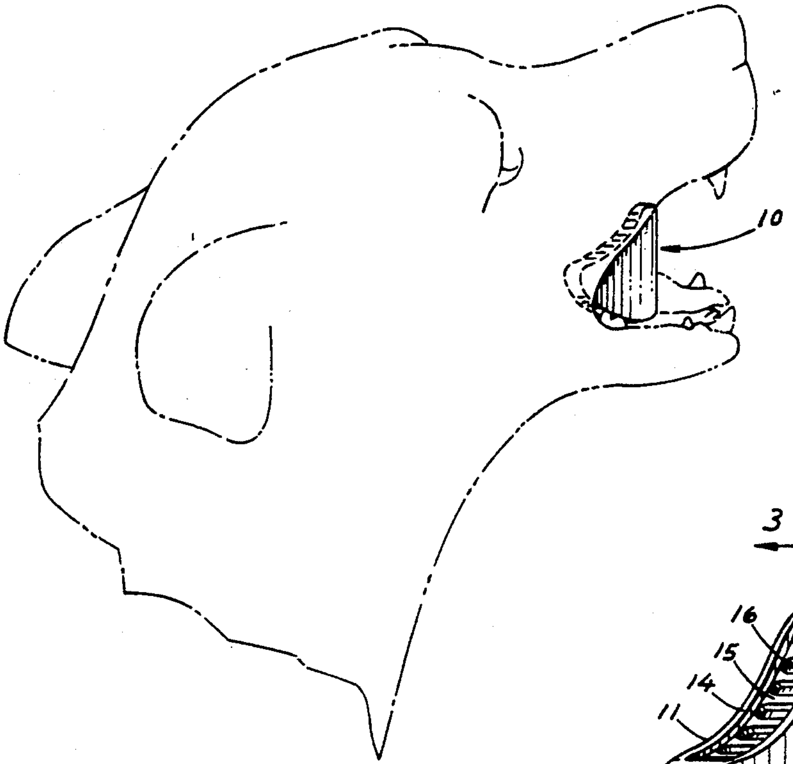
FIG. 2.
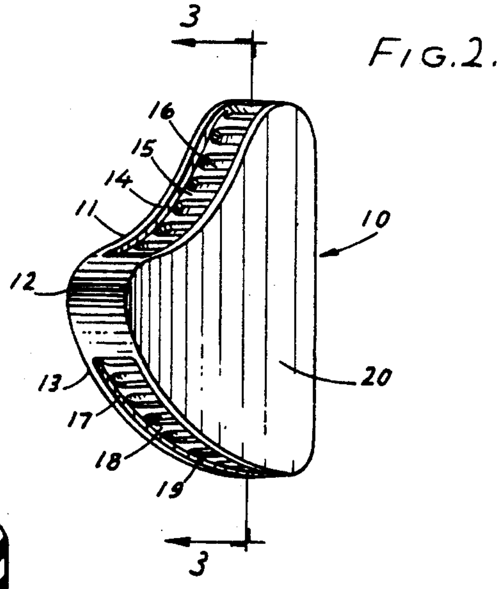
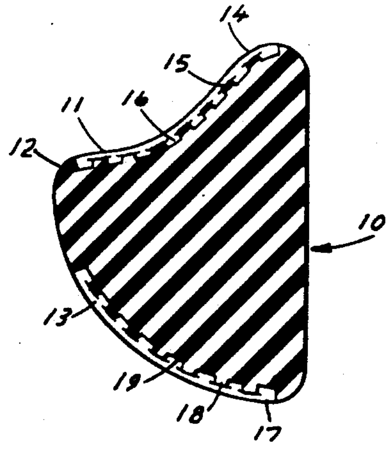
FIG. 3.

VETERINARY MOUTH PROP

FIELD OF THE INVENTION

This invention relates to devices used in the practice of veterinary medicine. More particularly, it relates to devices used to assist with the performance of oral veterinary procedures requiring the patient's mouth to be securely held in a fixed open position, often for extended periods of time.

BACKGROUND OF THE INVENTION

In the area of veterinary medicine, there are certain oral procedures which require the patient's mouth to be securely held in the open position for what may often be extended periods of time. Such procedures typically include the oral examination and routine dental treatment of the patient's mouth and teeth. Such procedures can also include the initiation and maintenance of general anesthesia intubation which is incidental to the performance of other surgical procedures. During the performance of any of these procedures it is necessary to protect the veterinarian's hands, the uncompleted dental work, the breathing tube and even the patient itself from sudden and unexpected mouth closure. And it is often necessary to provide such protection for extended periods of time.

The use of mouth props is well known in the area of human dentistry. See, for example, U.S. Pat. No. 2,220,674 issued to Bloomheart and U.S. Pat. No. 4,887,965 issued to Fox. Although such devices may be adaptable for use, on a different scale or size, with herbivore veterinary patients, the structural differences which exist between human jaws and teeth and that of their carnivore counterparts limit the usefulness and application of such devices in that area of veterinary medicine. This is not to say, however, that other devices do not exist for such application.

The use of devices for holding an animal's mouth open is also well known. The most common device currently available is similar in structure to the device shown and disclosed in U.S. Pat. No. 2,019,060 issued to Thibert. It consists of a configuration of three metal bars. A central bar is provided along which are situated two slidably movable and generally perpendicularly extending support bars. The central bar is encircled by a spiral spring which holds the support bars apart. The support bars are slidably adjustable along the length of the central bar so as to provide a wide variety of distances or settings for accommodating a variety of animal mouth sizes. The sliding support bars are fitted with rubber or nylon grommets which engage the animal's teeth.

In the experience of the applicant, numerous problems have been known to develop when such devices are used. In addition to being cumbersome and unwieldy, such devices often lend themselves to uncertain and uneven spring tensions and interference with tooth surface exposure. With the advent of the performance of more sophisticated and complex veterinary dental procedures such as root canals, pulp capping and restoration and surgery of the gums and jaw, maximum mouth and tooth surface exposure is necessary. The use of such a device often impedes or blocks access to such mouth and tooth exposure.

Another major complication caused by the metal devices is that they lack radiolucency. They must often be moved or removed in order for dental x-rays to be taken.

Additionally, rubber gloves and facial fur are frequently pinched and caught in the spiral spring between the sliding support bars. It is not uncommon for there to be a degeneration of the rubber or nylon grommets. The grommets may break or become worn and work out of position. With the grommets either missing or misaligned, teeth may be lodged directly against metal which can lead to tooth injury and failure of the device altogether. These metal devices do not lend themselves to quick and easy clean up once the veterinary procedure is completed.

SUMMARY OF THE INVENTION

It is, therefore, a principal object of this invention to provide a new, useful and uncomplicated veterinary mouth prop for securely holding an animal's mouth, and particularly the mouth of a carnivore, in the open position for what may be extended periods of time during the performance of certain veterinary procedures. It is a further object to provide such a mouth prop which can accommodate an infinite variety of shapes and sizes of mouths of carnivores and which allows maximum tooth surface exposure. It is yet another object to provide such a mouth prop which can be molded from a single piece of material and allows for easy clean up of the device. It is still another object to provide such a mouth prop which is radiolucent and which need not be moved or removed in order for x-rays to be taken.

The present invention has obtained these objects. It provides for a veterinary mouth prop which is molded from a single piece of radiolucent material and which is anatomically designed to safely and securely hold the patient's mouth in the open position for what may be extended periods of time. The device has two external surfaces adapted to engage the occlusal surfaces of the molars and premolars, or carnassials, on one side of the carnivore's mouth. The external surfaces further have ladder-like ribs adapted to engage the teeth cusp tips when the prop is firmly wedged in the patient's mouth. The foregoing and other features of the device of the present invention will be further apparent from the description which follows.

BRIEF DESCRIPTION OF THE DRAWINGS

FIG. 1 is a perspective view of the mouth prop of the present invention shown in phantom view inserted into a patient's mouth.

FIG. 2 is a perspective view of the prop shown in FIG. 1.

FIG. 3 is an elevational cross-section view of the prop shown in FIG. 2 taken along line 3—3 thereof.

DETAILED DESCRIPTION

Referring now to the drawings in detail, FIG. 2 shows a veterinary mouth prop for use with carnivorous patients constructed in accordance with the present invention. The mouth prop comprises an irregularly shaped and generally flat prop body generally identified 10 made of a radiolucent material. The prop body 10 includes a curved top surface 11, a front edge surface 12 and a curved bottom surface 13. The prop body further includes side surfaces 20. Integral with and defined within the curved top surface 11 of the prop body 10 is a recess 14. Further defined within the top surface recess 14 is a plurality of alternating ridges 15 and indents 16 which form in many respects what appears to be a ladder-like structure within said curved top surface 11. Integral with and defined within the curved bottom surface 13 of the prop body 10 is a recess 17. Further defined within the bottom surface recess 17 is a plurality of alternating ridges 18 and indents 19 similar to those defined within the top surface recess 14. See FIG. 3. The ridges 15 and indents 16 of the top surface recess 14 are functionally adapted to be engaged by the cusp tips of the carnivorous patient's upper premolar and molar teeth, or carnassials. Similarly, the ridges 18 and indents 19 of the bottom surface recess 17 are functionally adapted to be engaged by the cusp tips of the patient's lower carnassials.

In application, the prop body 10 is grasped by the user at the side surfaces 20. The prop body 10 is then urged, front edge surface 12 first, into the opened jaws of the patient's mouth. See FIG. 1. The cusp tips of the upper teeth, and in particular the upper carnassials to one side of the patient's mouth are initially engaged by the ridges 15 and indents 16 of the top surface recess 14. With the prop body 10 in that position, the prop body 10 is then rotated slightly until the ridges 18 and indents 19 of the bottom surface recess 17 are engaged by the cusp tips of the patient's bottom teeth, and in particular the lower carnassials located on the side of its mouth. The bottom surface 13 of the prop body 10 is then firmly urged along the lower carnassials until the prop is in place. To remove the prop body 10, the patient's mouth is opened slightly and the reverse of this procedure is followed.

From the foregoing detailed description of the illustrative embodiment of the invention set forth herein, it will be apparent that there has been provided a new, useful and uncomplicated veterinary mouth prop for securely holding an animal's mouth in the open position which can accommodate an infinite variety of shapes and sizes of mouths of carnivores, which allows maximum tooth surface exposure, which can be molded from a single piece of material thereby allowing for easy clean up of the device and which is radiolucent and thereby need not be moved or removed in order for x-rays to be taken.

The principles of this invention having been fully explained in connection with the foregoing, I hereby claim as my invention:

1. A veterinary mouth prop adapted to be placed between the teeth cusp tips of an upper jaw and the teeth cusp tips of a lower jaw of a veterinary patient comprising an upper jaw support, said upper jaw support including an essentially planar prop body having a concave top surface, said prop body top surface being curved slightly inwardly of said prop body, a lower jaw support, said lower jaw support including a convex bottom prop body surface being curved slightly outwardly of said prop body, an upper jaw teeth cusp tip engagement means, said upper jaw teeth cusp tip engagement means comprising a plurality of transverse ridges situated along said prop body top surface which are functionally adapted to engage said upper jaw teeth cusp tips, and a lower jaw teeth cusp tip engagement means, said lower jaw teeth cusp tip engagement means comprising a plurality of transverse ridges situated along said prop body bottom surface which are functionally adapted to move along said lower jaw teeth cusp tips when said prop body bottom surface is urged along said lower jaw teeth cusp tips and to engage said lower jaw teeth cusp tips to retain a jaw in an open position.

2. The veterinary mouth prop of claim 1 wherein said prop body is made of radiolucent material.

3. A mouth prop to be used during the performance of veterinary procedures and adapted to be placed between the upper jaw and upper teeth cusp tips and the lower jaw and lower teeth cusp tips of a veterinary patient comprising a prop body, said prop body comprising an essentially planar body including a top surface and a bottom surface, means for engaging the teeth cusp tips of one side of an upper jaw, said upper teeth cusp tip engagement means being integral with said prop body top surface and including a plurality of alternating transverse ridges and indents situated along said prop body top surface, means for engaging the teeth cusp tips of the same side of a lower jaw, said lower teeth cusp tips engagement means being integral with said prop body bottom surface and including a plurality of alternating transverse ridges and indents situated along said prop body bottom surface, and means for retaining the upper jaw and the lower jaw in a fixed spaced relation, said retaining means being integral with said prop body wherein said prop body top surface is slightly concave of said prop body and said bottom surface is slightly convex of said prop body, the ridges and indents of said prop body top surface are engageable with said upper jaw teeth cusp tips, and the ridges and indents of said prop body bottom surface are functionally adapted to be urged along said lower jaw teeth cusp tips and further functionally adapted to engage said lower jaw teeth cusp tips and thereby retain the jaws in an open position.

4. The veterinary mouth prop of claim 3 wherein said prop body is made of radiolucent material.

5. A jaw prop adapted to be placed between the teeth cusp tips of one side of an upper jaw and the teeth cusp tips of the same side of a lower jaw of a veterinary patient which comprises a prop body, said prop body comprising an essentially planar body and including an upper edge surface and a lower edge surface, means for engaging the teeth cusp tips of one side of an upper jaw which comprises a plurality of alternating transverse ridges and indents situated along the prop body upper edge surface, means for engaging the teeth cusp tips of the same side of a lower jaw which comprises a plurality of alternating transverse rides and indents situated along the prop body lower edge surface, and means for retaining the upper jaw and the lower jaw in a fixed space relation, said jaw retaining means comprising a slight concave curve of said prop body upper edge surface inwardly of said prop body and further comprising a slight convex curve of said prop body lower edge surface outwardly of said prop body, the ridges and indents of the inwardly curved upper edge prop body surface being engageable with the teeth cusp tips of one side of an upper jaw and the ridges and indents of the outwardly curved lower edge prop body surface being functionally adapted to be urged along the teeth cusp tips of the same side of a lower jaw as the lower jaw is separated from the upper jaw and to be engageable by said lower jaw teeth cusp tips to retain the jaws in an open position.

6. The veterinary jaw prop of claim 5 wherein said prop body is made of radiolucent material.

* * * * *